United States Patent
Carroll

(10) Patent No.: US 7,278,413 B2
(45) Date of Patent: Oct. 9, 2007

(54) FUEL PUMP SYSTEM WITH PRECISION VARIABLE RESTRICTOR

(75) Inventor: Kent L. Carroll, Bolingbrook, IL (US)

(73) Assignee: Pressure Specialist, Inc, Crystal Lake, IL (US)

( * ) Notice: Subject to any disclaimer, the term of this patent is extended or adjusted under 35 U.S.C. 154(b) by 0 days.

(21) Appl. No.: 11/379,185

(22) Filed: Apr. 18, 2006

(65) Prior Publication Data

US 2006/0231075 A1 Oct. 19, 2006

Related U.S. Application Data

(60) Provisional application No. 60/672,348, filed on Apr. 18, 2005.

(51) Int. Cl.
*F02B 23/00* (2006.01)

(52) U.S. Cl. .................................... 123/585

(58) Field of Classification Search ............... 123/585, 123/575

See application file for complete search history.

(56) References Cited

U.S. PATENT DOCUMENTS

| | | | | | |
|---|---|---|---|---|---|
| 2,034,855 | A | * | 3/1936 | Alby | ........................ 123/297 |
| 3,556,066 | A | * | 1/1971 | Muirhead et al. | ........... 123/575 |
| 4,499,885 | A | * | 2/1985 | Weissenbach et al. | ...... 123/525 |
| 5,427,507 | A | * | 6/1995 | Whitehead | ................... 417/344 |
| 5,967,099 | A | * | 10/1999 | Patrick | ........................ 123/1 A |
| 6,260,546 | B1 | * | 7/2001 | Vaughn | ....................... 123/585 |
| 6,520,165 | B1 | * | 2/2003 | Steele | ........................ 123/590 |
| 6,523,530 | B2 | * | 2/2003 | Evert et al. | ................. 123/585 |
| 6,581,576 | B1 | * | 6/2003 | Rousseau | ..................... 123/514 |
| 7,171,958 | B2 | * | 2/2007 | Young | ......................... 123/585 |

* cited by examiner

*Primary Examiner*—Thomas Moulis
(74) *Attorney, Agent, or Firm*—Levenfeld Pearlstein LLC

(57) ABSTRACT

A supplemental fuel supply system for use in an internal combustion engine having a fuel supply and using an on-demand supplemental oxygen supply includes a fuel pump and a supplemental oxygen supply regulator. The pump has a fuel supply and a fuel discharge. The pump includes an inlet for feed from the supplemental oxygen supply. The pump is driven by a portion of the supplemental oxygen supply such that when a demand is made on the on-demand supplemental oxygen supply to supplement oxygen to the internal combustion engine, a portion of the supplemental oxygen is introduced into the fuel pump to drive the fuel pump to discharge fuel therefrom to the internal combustion engine. The discharge from the supplemental oxygen supply regulator supplies both the fuel pump and the internal combustion engine.

7 Claims, 2 Drawing Sheets

FUEL PUMP SYSTEM WITH PRECISION VARIABLE RESTRICTOR

CROSS-REFERENCE TO RELATED APPLICATION DATA

This application claims the benefit of priority of U.S. Patent Application Ser. No. 60/672,348, filed Apr. 18, 2005.

BACKGROUND OF THE INVENTION

The present invention pertains to a supplemental fuel pump system. More particularly, the present invention pertains to a supplemental fuel pump system for use in conjunction with, and that is driven by, a supplemental oxygen supply for an internal combustion engine. Nitrous oxide injection systems are known for use in providing an additional "shot" of power for internal combustion engines. Most nitrous oxide systems are relatively rudimentary, and include only sufficient systems and components to inject nitrous oxide gas into the engine intake to increase the oxygen available for combustion and the intake pressure in the manifold.

However, problems can arise due to a number of factors. First, because nitrous oxide is a liquid stored gas, the equilibrium pressure in the storage vessel can vary significantly as the ambient temperature varies. This can result in the amount of nitrous oxide delivered to the engine varying by as much as 30 percent, within the normally expected operating environments.

In addition, the increased amount of oxygen requires a commensurate increase in fuel fed to the combustion system. Without supplemental fuel, the fuel mixture in the engine is far too lean (an excess of oxygen over stoichiometric proportions) which can result in engine overheating, improper detonation, and ultimately failure of piston, crankshaft, and valve components.

Accordingly, there is a need for a nitrous oxide precision variable restrictor that reduces (regulates) the supply pressure for a nitrous oxide injection system. Desirably, such a restrictor is used in conjunction with a nitrous oxide assist supplemental fuel pump system.

BRIEF SUMMARY OF THE INVENTION

A supplemental fuel supply system is configured for use with an internal combustion engine to supply an on-demand supplemental oxygen supply and a supplemental fuel supply. The system includes a supplemental fuel pump having a fuel supply and a fuel discharge. The pump including a supplemental oxygen supply inlet and is driven by a portion of the supplemental oxygen supply such that when a demand is made on the on-demand supplemental oxygen supply to supplement oxygen to the engine, a portion of the supplemental oxygen is introduced into the fuel pump to drive the fuel pump. A present system is contemplated for use with a supplemental nitrous oxide supply to the internal combustion engine.

The fuel pump includes a piston having a fuel chamber with the fuel supply and fuel discharge in flow communication with the fuel chamber. The piston includes a gas-side chamber with the portion of the nitrous oxide supply in flow communication with the gas-side chamber. In this manner, when demand is made on the on-demand nitrous oxide supply, the nitrous oxide pressurizes the gas-side chamber to drive the piston to discharge the fuel.

The piston is biased away from the fuel supply to draw fuel into the fuel chamber when there is little or no demand made on the on-demand supplemental oxygen supply. A present system includes a regulating device for regulating the flow of nitrous oxide from a nitrous oxide source to the fuel pump and to the internal combustion engine.

The regulating device simultaneously supplies nitrous oxide to the fuel pump and to the internal combustion engine such that the supply of nitrous oxide to the fuel pump serves to drive the pump to discharge fuel therefrom to the internal combustion engine.

A present regulating device includes a body and a piston (within the body) that has a bore therein. The piston is disposed to move between an inlet and an outlet to close down flow through the device as pressure in the device increases and to move away from between the inlet and the outlet when pressure in the device decreases.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
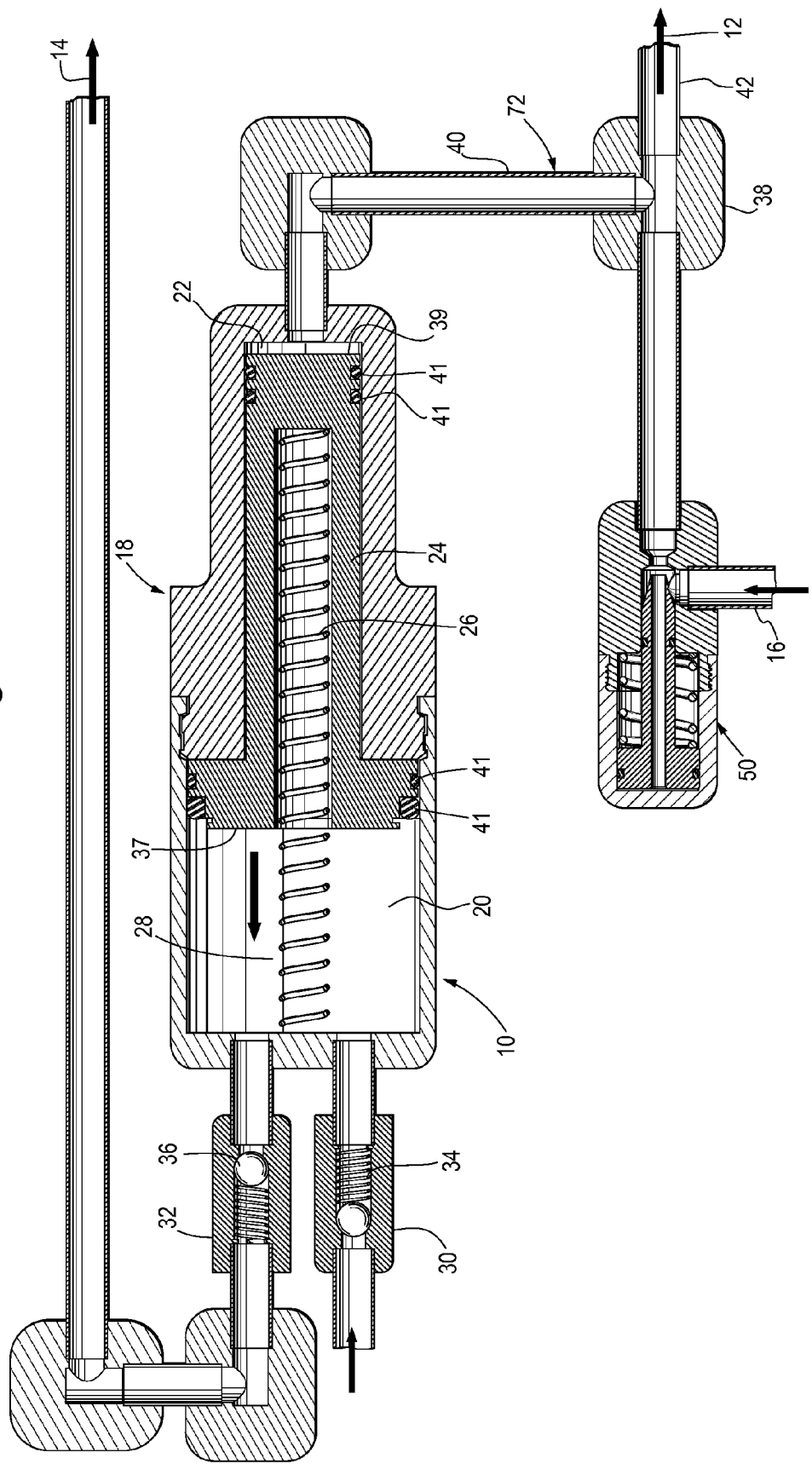
FIG. 1 is a schematic diagram of a nitrous oxide assist supplemental fuel pump system embodying the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring to FIG. 1 there is shown a schematic illustration of a nitrous oxide assist supplemental fuel pump system 10 embodying the principles of the present invention. The fuel supply system 10 is configured to supply a supplement or boost of nitrous oxide as indicated by the arrow at 12), for an internal combustion engine (not shown), in a pressure regulated manner. In addition, such a system 10 supplies a supplemental supply of fuel (as indicated by the arrow at 14) to prevent the engine from operating too lean, that is with an excess of oxygen (or a shortage of fuel) over stoichiometric proportions, which can result in engine overheating, improper detonation, and ultimately failure of piston, crankshaft, and valve components.

The supplemental fuel supply system 10 includes a nitrous oxide supply 16, and a supplemental fuel pump 18. The supplemental fuel pump 18 is a biased, single acting cylinder having a fuel side 20 that holds a captive quantity of fuel, which is delivered to the engine under pressure and a gas side 22 that receives nitrous oxide and drives a piston 24 to pump the fuel. The bias can be provided by a spring 26, conical washers or the like.

The pump 18 includes a fuel chamber 28, a fuel inlet 30 that feeds fuel into the chamber 28, and a fuel outlet 32 that directs the supplemental fuel to the combustion system. Both the inlet 30 and the outlet 32 are fitted with one-way flow devices, such as the illustrated inlet and outlet check valves 34, 36.

The piston 24 is configured with a fuel side 37 (in the fuel circuit) which is a driven side, and a smaller gas side 39 (which is in the gas circuit) that is the driving side. The fuel side 37 of the piston 24 has a larger surface area and thus is within the lower pressure circuit and the gas side 39 of the piston 24 has a smaller surface area and thus is within the higher pressure circuit. The spring 26 returns the piston 24 to its at rest position, as illustrated in FIG. 1, in which the fuel chamber 28 is expanded and filled with fuel. Seals, such as the illustrated O-rings 41 isolate the higher pressure regions from the lower pressure regions and provide seals at the various interfaces (gas/piston and fuel/piston).

The nitrous oxide supply 16 includes a tee or split 38 with one branch 40 routing nitrous oxide to the fuel pump 18 and the other branch 42 directing nitrous oxide to the combustion system (as at 12).

In the at rest state (FIG. 1), fuel is present in the fuel chamber 28. As nitrous oxide is charged to the combustion system, nitrous oxide is simultaneously directed into the cylinder gas side 22. This applies a force against the gas side 39 of the piston 24 which forced the piston 24 into the fuel chamber 28 (as indicated by the directional arrow at 44), against the bias. Fuel is pumped or expelled from the chamber 28, through the discharge check valve 36 and into the combustion system (as at 14). Thus, there is a simultaneous supply of supplemental fuel and nitrous oxide.

When the supply of nitrous oxide to the combustion system is terminated, the nitrous oxide (applied pressure) to the fuel pump 18 is also terminated. When this occurs, the fuel pump piston 24 is drawn back to its rest position by the return spring 26. This action draws in additional fuel to the chamber 28 to replace the fuel previously expelled or pumped from the chamber 28. The inlet and discharge check valves 30, 32 direct the high pressure fuel delivery, and the low pressure fuel recharge (into the chamber 28). Essentially, the supplemental fuel pump system 10 supplies an internal combustion engine with the simultaneous delivery of a precision charge of nitrous oxide 12, and the additional fuel 14 required to maintain a stoichiometric fuel/oxygen ratio.

Figure 2:
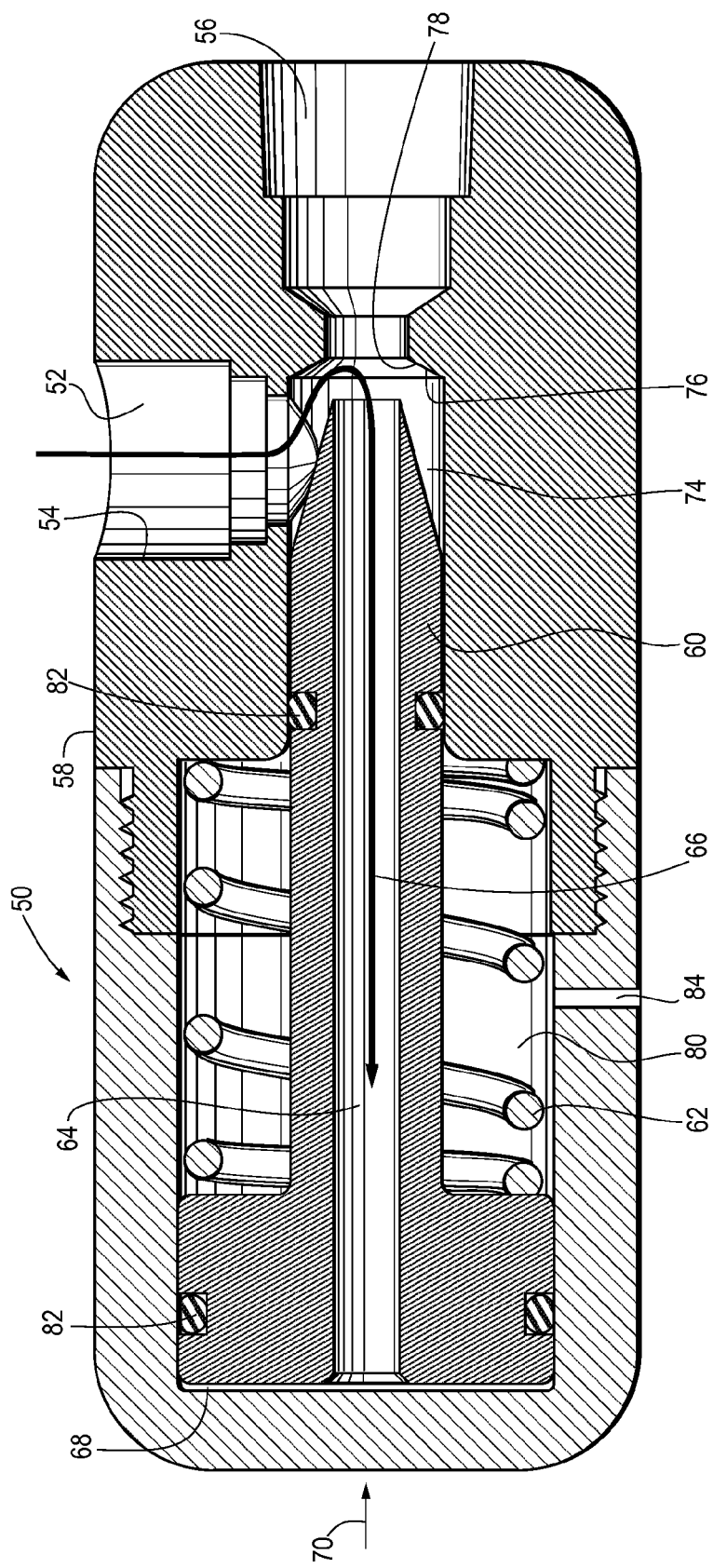
FIG. 2 is a cross-sectional illustration of a precision variable restrictor embodying the principles of the present invention.

The precision variable restrictor (PVR) 50, as seen enlarged in FIG. 2, accepts high pressure nitrous oxide (as at 52) from a control or charge valve (not shown) through an inlet 54, and delivers the pressure regulated stream, through an outlet 56, to the engine being served and to the supplemental fuel pump 18.

As set forth above, pressure regulation is desired because nitrous oxide is a liquid stored gas, and as such, the equilibrium pressure in the storage vessel can vary significantly as the ambient temperature varies. Without regulation, the amount of nitrous oxide delivered to the engine could vary by as much as 30 percent within the normally expected operating environment when the system is used, for example, to supply nitrous oxide to an internal combustion engine of a snowmobile.

The operating principle of the PVR 50 is similar to other preset regulators, such as that disclosed in Carroll, U.S. Pat. No. 6,948,520, which is commonly assigned with the present application and is incorporated herein by reference. The present PVR 50 includes a body 58 having the inlet 54 and outlet 56. A piston 60 resides in the body 58 and reciprocates between an open and a restricted position (rather than a "closed" position), in that there is no resilient regulator seat to isolate flow from the regulator 50. Rather, the PVR 50 is principally concerned with regulating a dynamic flow, and static bubble-tight performance is not necessary.

The PVR 50 is biased by, for example a spring 62, that is positioned in the PVR body 58 to bias the piston 60 to the open position (as seen in FIG. 2). A bore 64 in the piston 60 provides a flow path or flow communication (as indicated by the arrow at 66) from the inlet 54 to the backside 68 of piston 60. As will be appreciated from FIG. 2, the backside 68 of the piston 60 has a relatively large surface area. In this manner, as gas flows into the inlet 54, it also flows (as indicated by the arrow at 66) to the backside 68 of the piston 60. Because of the large area over which the gas exerts pressure on the piston backside 68, the piston 60 is urged to the restricted position, as indicated by the arrow at 70.

As downstream pressure increases (that is, the pressure between the PVR 50 and the combustion system and fuel pump 18, as at 72), the pressure on the piston backside 68 increases which closes down or restricts flow through the PVR 50. Conversely, as the downstream pressure declines, pressure on the piston backside 68 likewise declines and the spring 62 urges the PVR 50 to the open position.

When the PVR 50 is in the restricted position, a taper 74 on the piston 60 engages a taper 76 in the body 58 (near the outlet 56), to restrict or close down flow. However, as set forth above, because the PVR 50 is configured to regulate dynamic flow control (as opposed to static flow control or shut-off), a bubble-tight seal at the piston-body interface (as at 78) is not needed. Accordingly, there is no traditional seat in the PVR 50 that would provide a bubble-tight seal or shut-off capability.

As will be appreciated from a study of the figures, the PVR 50 includes a non-pressurized region 80 around the spring 62 and the piston 60. The non-pressurized region 80 is isolated from the pressurized regions by seals, such as the illustrated O-rings 82. In addition, a vent 84 is present in the non-pressurized region 80 of the PVR 50 to prevent pressurizing this area.

Advantageously, the present supplemental fuel pump system 10 and PVR 50 provide a regulated nitrous oxide delivery in conjunction with an injection of supplemental fuel that allows stoichiometrically accurate fuel/oxygen ratios to be calculated and delivered. In addition, the fuel pump 18 is powered by the output from the PVR 50 which is provided by the flowing nitrous oxide, thus providing truly simultaneous delivery of the required fuel 14 with the nitrous oxide charge 12. Moreover, the present system 10 provides this regulated, simultaneous nitrous oxide and fuel flow using compact components that operate without power other than the gas pressure provided by the nitrous oxide source.

Although the present invention is described with respect to a nitrous oxide enhanced internal combustion engine, it will be appreciated that the pressurized gas can be any of a number of oxygen-containing gases are contemplated.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred.

What is claimed is:

1. A supplemental fuel supply system for use in an internal combustion engine having a fuel supply and using an on-demand supplemental oxygen supply, comprising:

a fuel pump having a fuel supply and a fuel discharge, the pump including a supplemental oxygen supply inlet, the pump being driven by a portion of the supplemental oxygen supply such that when a demand is made on the on-demand supplemental oxygen supply to supplement oxygen to the internal combustion engine, a portion of the supplemental oxygen is introduced into the fuel pump to drive the fuel pump to discharge fuel therefrom to the internal combustion engine.

2. The supplemental fuel supply system in accordance with claim 1, wherein the fuel pump includes a piston having a fuel chamber with the fuel supply and fuel discharge in flow communication with the fuel chamber, the piston including a gas-side chamber with the portion of the supplemental oxygen supply in flow communication with the gas-side chamber and wherein when the demand is made on the on-demand supplemental oxygen supply, the portion of the supplemental oxygen pressurizes the gas-side chamber to drive the piston to discharge the fuel.

3. The supplemental fuel supply system in accordance with claim 2 wherein the piston is biased away from the fuel supply to draw fuel into the fuel chamber when there is a little or no demand made on the on-demand supplemental oxygen supply.

4. The supplemental fuel supply system in accordance with claim 1 wherein the supplemental oxygen supply is a nitrous oxygen supply.

5. The supplemental fuel supply system in accordance with claim 4 including regulating device for regulating a flow of nitrous oxide from a nitrous oxide source to the fuel pump and to the internal combustion engine.

6. The supplemental fuel supply system in accordance with claim 5 wherein the regulating device simultaneously supplies nitrous oxide to the fuel pump and to the internal combustion engine, wherein the supply of nitrous oxide to the fuel pump serves to drive the pump to discharge fuel therefrom to the internal combustion engine.

7. The supplemental fuel supply system in accordance with claim 6 wherein the regulating device includes a piston having a bore therein, the regulating device including a body having an inlet and an outlet wherein the piston is disposed to move between the inlet and the outlet to close down flow through the device as pressure in the device increases and to move away from between the inlet and the outlet when pressure in the device decreases.

\* \* \* \* \*